US012574901B2

(12) United States Patent (10) Patent No.: US 12,574,901 B2
Peng et al. (45) Date of Patent: Mar. 10, 2026

(54) INFORMATION PROCESSING METHOD AND APPARATUS, AND TERMINAL

(71) Applicant: VIVO MOBILE COMMUNICATION CO., LTD., Guangdong (CN)

(72) Inventors: Shuyan Peng, Guangdong (CN); Zichao Ji, Guangdong (CN); Siqi Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 478 days.

(21) Appl. No.: 18/090,562

(22) Filed: Dec. 29, 2022

(65) Prior Publication Data

US 2023/0136170 A1 May 4, 2023

Related U.S. Application Data

(63) Continuation of application No. PCT/CN2021/102264, filed on Jun. 25, 2021.

(30) Foreign Application Priority Data

Jun. 30, 2020 (CN) .......................... 202010623972.1

(51) Int. Cl.
*H04W 72/02* (2009.01)
*H04W 72/1263* (2023.01)
(Continued)

(52) U.S. Cl.
CPC ....... *H04W 72/02* (2013.01); *H04W 72/1263* (2013.01); *H04W 76/14* (2018.02); *H04W 92/18* (2013.01)

(58) Field of Classification Search
CPC . H04W 72/02; H04W 72/1263; H04W 76/14; H04W 92/18; H04W 4/40;
(Continued)

(56) References Cited

U.S. PATENT DOCUMENTS 11,510,211 B2 * 11/2022 Ji .......................... H04W 76/27
12,389,413 B2 * 8/2025 Park ...................... H04L 5/0007
(Continued)

FOREIGN PATENT DOCUMENTS

CN 106686736 A 5/2017
CN 106793090 A 5/2017
(Continued)

OTHER PUBLICATIONS

International Search Report and Written Opinion for Application No. PCT /CN2021/102264, dated Sep. 26, 2021, 8 Pages.
(Continued)

*Primary Examiner* — Ayaz R Sheikh
*Assistant Examiner* — Louis Samara
(74) *Attorney, Agent, or Firm* — BROOKS KUSHMAN P.C.

(57) ABSTRACT

An information processing method and apparatus, and a terminal, and which belong to the field of communications technologies. The information processing method includes: making resource selection according to an information processing capability; where the information processing capability includes: not supporting reception of sidelink feedback channel; where in a case that the information processing capability indicates that the terminal does not support reception of sidelink feedback channel, PSFCH is disabled.

16 Claims, 3 Drawing Sheets

(51) Int. Cl.
　　*H04W 76/14*　　　　(2018.01)
　　*H04W 92/18*　　　　(2009.01)
(58) Field of Classification Search
　　CPC .... H04W 76/27; H04L 1/1854; H04L 5/0016;
　　　　　　　　　　H04L 5/0033; H04L 5/0007
　　See application file for complete search history.

(56) References Cited

U.S. PATENT DOCUMENTS

| | | | | |
|---|---|---|---|---|
| 2019/0075548 | A1 * | 3/2019 | Lee | H04W 4/40 |
| 2019/0357304 | A1 * | 11/2019 | Zeng | H04L 5/0051 |
| 2019/0373617 | A1 * | 12/2019 | Sun | H04W 88/02 |
| 2020/0313805 | A1 * | 10/2020 | Park | H04W 72/21 |
| 2020/0396040 | A1 * | 12/2020 | Miao | H04W 4/40 |
| 2021/0212053 | A1 * | 7/2021 | Ji | H04W 72/51 |
| 2021/0243739 | A1 | 8/2021 | Zhao et al. | |
| 2022/0045798 | A1 * | 2/2022 | Tang | H04W 4/40 |
| 2022/0279484 | A1 * | 9/2022 | Yoshioka | H04L 1/08 |

FOREIGN PATENT DOCUMENTS

| | | | | | |
|---|---|---|---|---|---|
| CN | 106793154 | A | | 5/2017 | |
| CN | 110958696 | A | | 4/2020 | |
| CN | 110972297 | A | | 4/2020 | |
| CN | 111865504 | A | * | 10/2020 | H04W 72/20 |
| WO | 2018084796 | A1 | | 5/2018 | |
| WO | 2019174742 | A1 | | 9/2019 | |
| WO | 2020068252 | A1 | | 4/2020 | |
| WO | 2020071783 | A1 | | 4/2020 | |
| WO | WO-2020063647 | A1 | * | 4/2020 | H04W 72/20 |
| WO | 2020087854 | A1 | | 5/2020 | |

OTHER PUBLICATIONS

Vivo, "Physical layer procedure for NR sidelink" 3GPP TSG RAN WG1 Meeting #98bis, Chongqing, China, Oct. 2019, R1-1910217, 24 Pages.
Extended European Search Report for Application No. 21832541.3, dated Nov. 9, 2023, 12 Pages.
Ericsson "Other PC5 Enhancements for V2X" 3GPP TSG RAN WG1 Meeting #84, St Julian's, Malta, Feb. 2016, R1-161090, 2 Pages.

Samsung "On Physical layer procedure for NR sidelink" 3GPP TSG RAN WG1 #100-e, e-Meeting, Feb. 2020, R1-2000621, 12 Pages.
Nokia, Nokia Shanghai Bell "Remaining issues on physical layer procedures for V2X sidelink" 3GPP TSG-RAN WG1 Meeting #101, e-Meeting, May 2020, R1-2003313, 6 Pages.
Kyocera "Consideration of the P2V transmission scheme" 3GPP TSG-RAN WG2 #96, Reno, USA, Nov. 2016, R2-168043, 3 Pages.
Vivo "Uplink and Sidelink transmission prioritization in NR V2X" 3GPP TSG-RAN WG2 Meeting #106, Reno, USA, May 2019, R2-1905847, 8 Pages.
Second Office Action for Chinese Application No. 202010623972.1, dated Feb. 7, 2024, 8 Pages.
First Office Action for Japanese Application No. 2022-581640, dated Feb. 8, 2024, 9 Pages.
Sequans Communications, "On HARQ Procedure for NR Sidelink," 3GPP TSG RAN WG1 Meeting #99, Agenda item 7.2.4.5, Nov. 18-22, 2019, R1-1913012, Reno, Nevada, USA, 6 Pages.
Panasonic, "Remaining Issue on Physical Layer Procedures for Sidelink in NR V2X," 3GPP TSG RAN WG1 Meeting #100, Agenda item 7.2.4.5, Feb. 24-Mar. 6, 2020, R1-2000993, e-meeting, 6 Pages.
AT&T et al., "RAN1 UE Features List for Rel-16 NR Updated After RAN1#101-e," 3GPP TSG RAN WG1 #101-e, Agenda item 7.2.11, May 25-Jun. 5, 2020, R1-2005110, e-meeting, 57 Pages.
Mediatek Inc., "Need Codes in sl-RxPool [M114]," 3GPP TSG-RAN WG2 Meeting #110-e, Agenda item 6.4.2.1, Jun. 1-12, 2020, R2-2005310, online, 9 Pages.
OPPO, "Summary of Open Issue for V2X Capability (OPPO)," 3GPP TSG-RAN WG2 #110b-e, Agenda item 6.4.2.2, Jun. 2020, R2-2005955, e-meeting, 16 Pages.
"LS in updated Pel-16 RAN1 UE Features Lists for NR After RAN1#101-e," 3GPP TSG RAN WG2#109-e, Feb. 24-Mar. 6, 2020, R2-2006378, e-meeting, 1 Pages.
Ericsson. PHY layer procedures for NR sidelink. 3GPP TSG-RAN WG1 Meeting #9 8. R1 1908917. Online. Aug. 2019. 10 pages.
Huawei, HiSilicon. Sidelink physical layer structure for NR V2X. R1-1910054. Online. Oct. 2019. 35 pages.
Ericsson. PHY layer procedures for NR sidelink. 3GPP TSG-RAN WG1 Meeting #98 bis. R1 1910538. Online. Oct. 2019. 14 pages.
ASUSTek. Discussion on sidelink physical layer procedure on NR V2X. 3GPP TSG RAN WG1 #99. R1-1912906. Online. Nov. 2019. 10 pages.
First Korean Office Action for Korean Patent Application No. 10-2023-7003455 dated Apr. 9, 2025. 11 pages.

* cited by examiner

12

Network-side device

11

11

Terminal

Terminal

Start

Make resource selection according to an information processing capability of a terminal or a type of a terminal; and/or process sidelink transmission according to the information processing capability of the terminal or the type of the terminal

201

End

INFORMATION PROCESSING METHOD AND APPARATUS, AND TERMINAL

CROSS-REFERENCE TO RELATED APPLICATIONS

This application is a continuation of PCT International Application No. PCT/CN2021/102264 filed on Jun. 25, 2021, which claims priority to Chinese Patent Application No. 202010623972.1, filed on Jun. 30, 2020, which are incorporated herein by reference in their entireties.

TECHNICAL FIELD

This application relates to the field of communications technologies, and specifically, to an information processing method and apparatus, and a terminal.

BACKGROUND

New radio (NR) R17 vehicle to everything (Vehicle to everything, V2X) needs to support communication between pedestrian user equipment (Pedestrian User Equipment, PUE) and vehicles. Compared with vehicle user equipment (Vehicle UE, VUE), the PUE has to include an additional consideration for power saving. PUEs have different capabilities in receiving sidelink (SL) information. Depending on the different reception capabilities of PUEs, the PUEs may behave differently in resource (pool) selection, unicast processing mode, and groupcast processing mode. However, modes defined based on existing V2X are all on a basis of that the UE is capable of SL reception. For terminals incapable of SL information reception, this may lead to more power consumption, affecting resource utilization of the system.

SUMMARY

According to a first aspect, an information processing method applied to a terminal is provided, where the method includes:

making resource selection according to an information processing capability of the terminal or a type of the terminal; and/or processing sidelink transmission according to the information processing capability of the terminal or the type of the terminal.

According to a second aspect, an information processing apparatus is provided, including:

a processing module, configured to make resource selection according to an information processing capability of a terminal or a type of the terminal; and/or process sidelink transmission according to the information processing capability of the terminal or the type of the terminal.

According to a third aspect, a terminal is provided, where the terminal includes a processor, a memory, and a program or instructions stored on the memory and capable of running on the processor, and when the program or instructions are executed by the processor, the steps of the method according to the first aspect are implemented.

According to a fourth aspect, a readable storage medium is provided, where the readable storage medium stores a program or instructions, and when the program or instructions are executed by a processor, the steps of the method according to the first aspect are implemented.

According to a fifth aspect, a chip is provided, where the chip includes a processor and a communications interface, the communications interface is coupled to the processor, and the processor is configured to run a program or instructions to implement the method according to the first aspect.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that data used in this way is used interchangeably in appropriate circumstances so that the embodiments of this application can be implemented in other orders than the order illustrated or described herein. In addition, "first" and "second" are usually used to distinguish objects of a same type, and do not restrict a quantity of objects. For example, there may be one or a plurality of first objects. In addition, in this specification and claims, "and/or" represents at least one of connected objects, and the symbol "/" generally represents an "or" relationship between the associated objects.

It should be noted that the technologies described in the embodiments of this application are not limited to long term evolution (LTE)/LTE-Advanced (LTE-A) systems, and may also be used in other wireless communications systems, such as code division multiple access (CDMA), time division multiple access (, TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. The technology described in the embodiments of this application may be used in the above-mentioned systems and radio technologies as well as other systems and radio technologies. However, in the following descriptions, a new radio (NR) system is described for an illustration purpose, and NR terms are used in most of the following descriptions, although these technologies may also be applied to other applications than an NR system application, such as a sixth generation (6th Generation, 6G) communications system.

Figure 1:
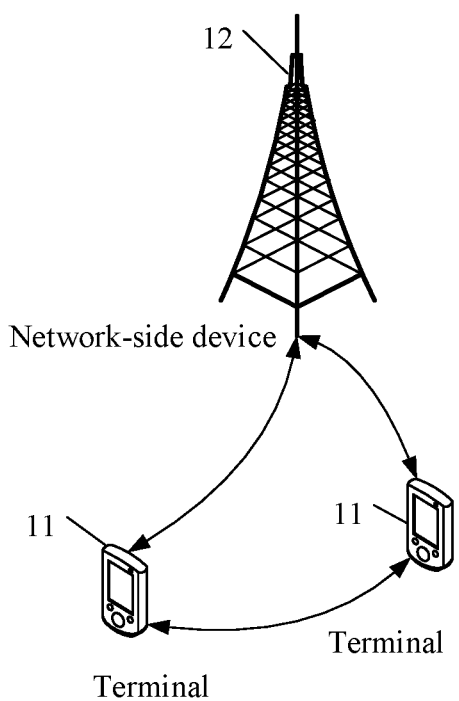
FIG. 1 is a block diagram of a wireless communications system according to an embodiment of this application.

FIG. 1 is a block diagram of a wireless communications system to which an embodiment of this application may be applied. The wireless communications system includes a terminal 11 and a network-side device 12. The terminal 11 may also be referred to as a terminal device or user equipment (UE). The terminal 11 may be a terminal-side device such as a mobile phone, a tablet personal computer, a laptop computer also referred to as a notebook computer, a personal digital assistant (PDA), a palmtop computer, a netbook, an ultra-mobile personal computer (UMPC), a mobile Internet device (MID), a wearable device or an in-vehicle device (VUE), or a pedestrian user equipment (PUE). The wearable device includes a wristband, a headset, glasses, and the like. It should be noted that a specific type of the terminal 11 is not limited in the embodiments of this application. The network-side device 12 may be a base station or a core network, where the base station may be referred to as a NodeB, an evolved NodeB, an access point, a base transceiver station (BTS), a radio base station, a radio transceiver, a basic service set (BSS), an extended service set (ESS), a B Node, an evolved B node (eNB), a home NodeB, a home evolved NodeB, a WLAN access point, a Wi-Fi node, a transmitting receiving point (TRP), or another appropriate term in the art. As long as the same technical effect is achieved, the base station is not limited to a specific technical term. It should be noted that the base station in the NR system is taken only as an example in the embodiments of this application, but a specific type of the base station is not limited.

For description of the embodiments of this application, some concepts used in the following description are first described.

V2X: A long term evolution (LTE) system supports sidelink transmission, that is, data transmission between terminals is directly performed on the physical layer. In an LTE sidelink, communication is performed based on broadcast. Although the LTE SL may be used to support basic security communication of V2X, the LTE sidelink is not applicable to other more advanced V2X services. A 5G NR system supports more-advanced sidelink transmission designs, such as unicast and multicast or groupcast, and therefore can support more comprehensive service types.

Starting from Release 12, an LTE system supports a sidelink for direct data transmission between user equipments without using a network device. LTE sidelink is designed to be applicable to specific public safety affairs (for example, emergency communication on a disaster site such as a fire site or an earthquake site), vehicle to everything communication, or the like. Vehicle to everything communication includes various services, for example, basic security communication, advanced driving (self-driving), platooning, and sensor extension. The LTE sidelink supports only broadcast communication, and therefore is mainly used for basic security communication. Other advanced V2X services with strict QoS (Quality of Service) requirements in terms of delay and reliability are supported by new radio NR sidelink.

The NR R16 V2X supports vehicle to vehicle (V2V) communication. The R17 needs to support PUE in consideration of pedestrian to vehicle (P2V) communication. In addition, vehicle to pedestrian (V2P) communication and pedestrian to pedestrian (P2P) communication may also be considered.

LTE PUE: Some PUEs of LTE PUEs do not support reception of SL information. This is because some PUEs have only one receive (RX) chain and the PUEs need to receive downlink (DL) information. Some PUEs support reception of SL information. If PUE does not support reception of SL information, the PUE may select a resource based on only a random selection mode. If PUE supports reception of SL information, the PUE may select a resource based on a partial sensing mode or random selection mode according to configuration information.

The LTE PUE supports two resource selection modes: one is a random selection mode, and the other is resource selection based on a partial sensing result. A parameter about which resource selection mode to select may be configured by an upper layer. If supporting two resource selection modes is configured in radio resource control (RRC), the PUE determines to use which resource selection mode. In LTE, in the random resource selection mode, the PUE does not receive information in SL, that is, instead of performing operations such as demodulating sidelink control information (SCI) and measuring reference signal received power (RSRP) to sense for resource exclusion, the PUE randomly selects a resource within a selection window according to a specific rule (for example, radio frequency (RF) limitation). In LTE, it is considered that the PUE may not necessarily have two downlink RX chains, that is, it is considered that the PUE may not necessarily be capable of simultaneously receiving a DL signal transmitted by a base station and receiving a SL signal transmitted by VUE. Therefore, the PUE may not support sensing.

R16 Sidelink Physical Sidelink Feedback Channel (PSFCH):

To carry acknowledgement (ACK)/negative acknowledgement (NACK) feedback information in SL, the NR V2X supports a new SL channel, that is, PSFCH. A PSFCH period is N (N=1/2/4) in time domain, where N may be understood as that the PSFCH is included every N slots. N=0 indicates that no PSFCH is configured in the resource pool.

In unicast or groupcast transmission, UE may use feedback-based data transmission. In RRC, whether a PSFCH resource is configured in a resource pool may be configured. In SCI, whether physical sidelink shared channel (PSSCH) transmission scheduled by the SCI needs to be fed back is indicated. If it is indicated that the hybrid automatic repeat request (HARD) is enabled, a receive end needs to transmit feedback information on a corresponding PSFCH resource; otherwise, no feedback information is sent. For a data transmission device, if the PSFCH is enabled, it is indicated that feedback information is received on a corresponding PSFCH resource; otherwise, no feedback information is received.

R16 Sidelink Groupcast Option:

Groupcast option 1: In a same group, receive end UEs transmit only NACK to a transmit end. For reception of same data, different UEs transmit feedback information on a same resource.

Groupcast option 2: A receive end transmits NACK/ACK to a transmit end. Different UEs select different resources for transmission.

The following specifically describes the information processing method provided in the embodiments of this application through specific embodiments and application scenarios thereof with reference to the accompanying drawings.

Figure 2:
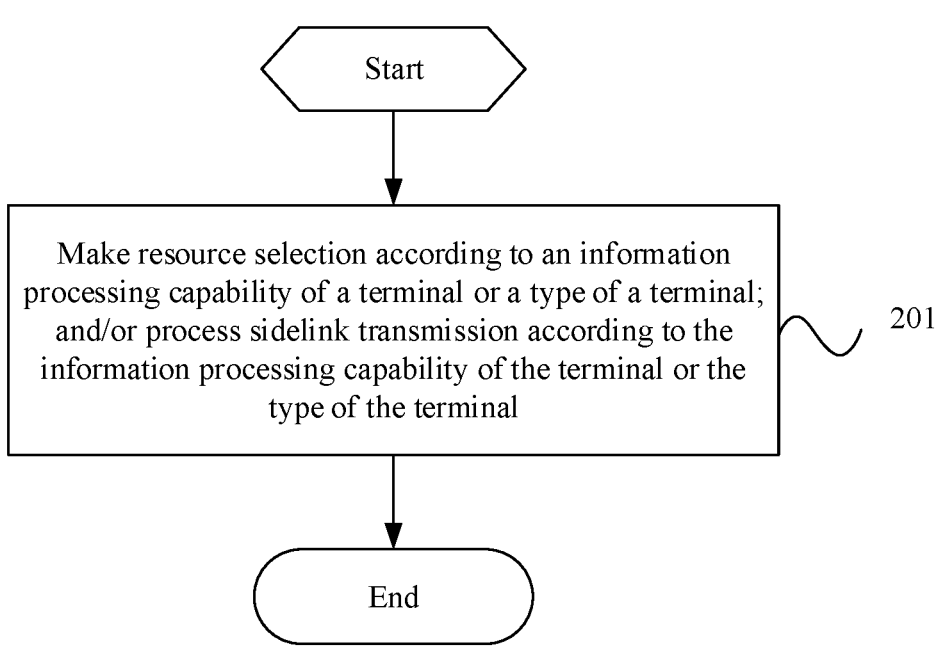
FIG. 2 is a schematic flowchart of an information processing method according to an embodiment of this application.

As shown in FIG. 2, an embodiment of this application provides an information processing method, applied to a terminal and including the following step:

Step 201: Make resource selection according to an information processing capability of the terminal or a type of the terminal; and/or process sidelink transmission according to the information processing capability of the terminal or the type of the terminal.

For different information processing capabilities or different terminal types, the terminal may select different resources or resource pools. The information processing capability may be a processing capability for SL information or a processing capability for Uu interface data. The SL information may include sidelink feedback information, sidelink data information, and sidelink control information. The type of the terminal may include PUE and VUE. For resource selection, a resource may be selected according to the information processing capability of the terminal. For example, resource selection is made based on whether the terminal supports reception of SL information according to the type of the terminal. For example, a resource selection mode configured when the terminal is PUE is different from that configured when the terminal is VUE.

Terminals with different terminal information processing capabilities or of different terminal types may select different unicast processing modes or different groupcast processing modes. In this embodiment, the processing sidelink transmission may include establishing, processing, or managing sidelink transmission. Different sidelink transmission modes are configured for different information processing capabilities of the terminals or different terminal types. For example, a condition for establishing a unicast connection, or a groupcast processing mode is defined based on whether the terminal supports reception of SL information, or a sidelink transmission mode configured when the terminal is PUE is different from that configured when the terminal is VUE. In this way, resource utilization of the transmit terminal can be improved and transmit overheads can be reduced, thereby achieving the purpose of power saving.

In this embodiment of this application, according to an information processing capability of a terminal or a type of the terminal, resource selection is made and/or sidelink transmission is processed. Different resource selection modes and sidelink transmission modes may be defined for different information processing capabilities or terminal types, so as to improve resource utilization of the transmit terminal, thereby increasing transmission efficiency of the transmit terminal, boosting system spectrum utilization, and reducing terminal power consumption.

Specifically, the information processing capability of the terminal may include one of the following:

(a) Not supporting reception of sidelink channel. The sidelink channel may include sidelink feedback channel, sidelink shared channel, sidelink control channel, and the like. The sidelink feedback channel is referred to as PSFCH, the sidelink control channel is a physical sidelink control channel (PSCCH), and the sidelink shared channel is referred to as PSSCH.

It should be noted that the not supporting reception of sidelink channel may alternatively be not supporting reception of sidelink information. The terminal with this capability does not support reception of SL information, but supports reception of information over Uu interface. The sidelink information may include sidelink feedback information, sidelink data information, sidelink control information, synchronization information, and the like. The sidelink data information may be carried on PSSCH, and the sidelink control information may be carried on PSCCH and/or carried on PSSCH.

(b) Supporting reception of sidelink feedback information, but not supporting reception of sidelink data information or sidelink control information. For example, only reception of sidelink feedback information is supported, but reception of sidelink data information and sidelink control information is not supported.

(c) Supporting reception of sidelink feedback channel, but not supporting reception of sidelink control channel or sidelink shared channel. For example, only reception of PSFCH is supported, but reception of PSCCH and PSSCH is not supported.

(d) Supporting reception of sidelink data information, sidelink control information, and sidelink feedback information.

(e) Supporting reception of sidelink control channel, sidelink shared channel, and sidelink feedback channel. That is, reception of PSFCH, PSCCH, and PSSCH is supported.

(f) Supporting reception of sidelink feedback channel and sidelink control channel, but not supporting reception of sidelink shared channel. That is, reception of PSFCH and PSCCH is supported, but reception of PSSCH is not supported.

(g) Supporting simultaneous processing of information over Uu interface and information over PC5 interface. The information over PC5 interface includes sidelink feedback information, sidelink data information, and sidelink control information. The information over Uu interface includes information transmitted over uplink (UL) and downlink (DL), the Uu interface is a transmission interface between a terminal and a base station, the information over PC5 interface may be SL information, and the PC5 interface is a transmission interface between sidelink terminals.

(h) Not supporting simultaneous processing of information over Uu interface and information over PC5 interface. In the case that the terminal does not support simultaneous processing of the information over Uu interface and the information over PC5 interface, the terminal has only one RX chain, and can receive the information over Uu interface or sidelink information at a given time.

(i) Supporting transmission of sidelink feedback channel. It should be noted that the supporting transmission of sidelink feedback channel may alternatively be supporting transmission of sidelink feedback information.

(j) Not supporting transmission of sidelink feedback channel. It should be noted that the not supporting transmission of sidelink feedback channel may alternatively be not supporting transmission of sidelink feedback information.

In the foregoing items i and j, the terminal capability is defined based on whether the terminal supports transmission of sidelink feedback information or PSFCH. On a basis of any one of items a to h, a further definition may be made into: supporting transmission of sidelink feedback information or PSFCH, and not supporting transmission of sidelink feedback information or PSFCH.

For example, on the basis of the capability (c), a further definition may be as follows:

(1) supporting reception of sidelink feedback information, not supporting reception of sidelink data information or sidelink control information, and not supporting transmission of sidelink feedback information or not supporting transmission of sidelink feedback channel; and (2) supporting reception of sidelink feedback information, not supporting reception of sidelink data information or sidelink control information, and supporting transmission of sidelink feedback information or supporting transmission of sidelink feedback channel.

For example, on the basis of the capability (e), a further definition may be as follows:

(1) supporting reception of sidelink data information, sidelink control information, and sidelink feedback information, and not supporting transmission of sidelink feedback information or not supporting transmission of sidelink feedback channel.

(2) supporting reception of sidelink data information, sidelink control information, and sidelink feedback information, and supporting transmission of sidelink feedback information or supporting transmission of sidelink feedback channel.

It should be noted that in predefining the information processing capability of the terminal, a protocol may define one or more capabilities of the foregoing items a to j as optional items of the terminal capability, and an information processing capability the terminal actually has is one of the foregoing items.

Optionally, during resource selection, the terminal may make resource selection according to the information processing capability of the terminal. Specifically, resource selection according to the information processing capability of the terminal includes at least one of the following:

(1) Selecting a resource pool or resource according to a rule corresponding to the information processing capability. The rule corresponding to the information processing capability may be a rule predefined by the protocol, or may be a rule configured or preconfigured by the terminal or network. For example, a rule corresponding to a first information processing capability is a first resource selection mode, and a rule corresponding to a second information processing capability is a second resource selection mode. The resource or resource pool selected by the terminal is a resource or resource pool corresponding to the information processing capability of the terminal.

(2) Selecting a resource pool or resource corresponding to the information processing capability according to the information processing capability. For different information processing capabilities of the terminal, there are different resources or resource pools. A resource or resource pool corresponding to the information processing capability of the terminal may be selected according to the information processing capability of the terminal. For example, the terminal with the first information processing capability corresponds to a first resource, and the terminal with the second information processing capability corresponds to a second resource. The resource pool or resource corresponding to the information processing capability may be a rule predefined by the protocol, or may be a rule configured or preconfigured by the terminal or network. In this embodiment, the resource or resource pool selected by the terminal corresponds to the information processing capability of the terminal, and different information processing capabilities correspond to different resources or resource pools.

(3) Selecting, according to a resource selection mode of the terminal, a resource pool or resource corresponding to the information processing capability. The resource selection mode may include a random selection mode or a partial sensing mode. Different resource selection modes correspond to different information processing capabilities. The resource or resource pool selected by the terminal corresponds to the information processing capability of the terminal, and different information processing capabilities correspond to different resources or resource pools. The resource pool or resource corresponding to the information processing capability may be a rule predefined by the protocol, or may be a rule configured or preconfigured by the terminal or network.

Optionally, during resource selection, the terminal may make resource selection according to the type of the terminal. Specifically, that the terminal makes resource selection according to the type of the terminal includes at least one of the following:

(1) Selecting a resource pool or resource according to a rule corresponding to the type of the terminal. The rule corresponding to the type of the terminal may be a rule predefined by the protocol, or may be a rule configured or preconfigured by the terminal or network. For example, a resource selection mode of PUE is preconfigured as a first resource selection mode, and a resource selection mode of VUE is preconfigured as a second resource selection mode.

(2) Selecting, according to the type of the terminal, a resource pool or resource corresponding to the type of the terminal. For different terminal types, there are different resources or resource pools. A resource or resource pool corresponding to the type of the terminal may be selected according to the type of the terminal. For example, PUE corresponds to a first resource, and VUE corresponds to a second resource. The resource pool or resource corresponding to the type of the terminal may be a rule predefined by the protocol, or may be a rule configured or preconfigured by the terminal or network.

(3) Selecting, according to a resource selection mode of the terminal, a resource pool or resource corresponding to the type of the terminal. The resource selection mode may include a random selection mode or a partial sensing mode. Different resource selection modes correspond to different terminal types. The resource pool or resource corresponding to the type of the terminal may be a rule predefined by the protocol, or may be a rule configured or preconfigured by the terminal or network.

In this embodiment, the resource or resource pool selected by the terminal corresponds to the type of the terminal, and different terminal types correspond to different resources or resource pools.

Further, the selected resource pool satisfies at least one of the following conditions:

A: Being a resource pool including no feedback resource. Specifically, the selected resource pool includes no feedback resource, including one of the following:

a1: The resource pool does not support PSFCH configuration. That is, the resource pool selected by the terminal does not support PSFCH configuration.

a2: PSFCHs in the resource pool are configured with a period of zero. That is, PSFCHs in the resource pool selected by the terminal are configured with a period of zero. For example, if UE supports neither reception of PSSCH/PSCCH nor reception of PSFCH, PSFCHs in the resource pool of the UE are configured with a period of 0.

a3: No PSFCH is configured in the resource pool. That is, the terminal does not select any resource pool configured with PSFCH.

It should be noted that this embodiment mainly focuses on PUE without SL information reception capability. A resource pool with no feedback resource is selected, so that the PUE may maximize a time domain resource. For transmissions of a same transport block, the PUE can reduce a transmission bit rate to enhance transmission reliability. In addition, in a case that more time domain resources are available, a TB in a larger transport block set (TBS) for transmission may be applicable to a terminal without SL reception capability (including PUE not supporting reception of PSFCH), such as UE not supporting reception of sidelink feedback information, sidelink data information, or sidelink control information, or UE not supporting simultaneous processing of information over Uu interface and sidelink information.

B: Physical sidelink feedback channel PSFCH being disabled. Specifically, the physical sidelink feedback channel PSFCH being disabled may be indicated by using at least one of the following manners:

b1: Radio resource control RRC indicating that PSFCH is disabled. For example, if the UE supports neither reception of PSSCH/PSCCH nor reception of PSFCH, a disabled state is indicated for PSFCH in the RRC during information transmission by the UE. For another example, if the terminal is PUE, the RRC may be configured to a preset value, and the preset value is used to implicitly indicate that PSFCH is disabled.

b2: Sidelink control information SCI indicating that PSFCH is disabled. For example, if the UE supports neither reception of PSSCH/PSCCH nor reception of PSFCH, a disabled state is indicated for PSFCH in the SCI during information transmission by the UE. For another example, if the terminal is PUE, the SCI may be configured to a preset value, and the preset value is used to implicitly indicate that PSFCH is disabled.

b3: Downlink control information (DCI) indicating no feedback. For example, a mode mode-1 is used to indicate no feedback, indicating that SL PSFCH is disabled.

b4: Field values of DCI being partially or all configured to preset values, respectively. For example, a special code point of a special threshold in the DCI is used to indicate that PSFCH is disabled.

b5: Field values of SCI being partially or all configured to preset values, respectively. For example, a special code point of a special threshold in the SCI is used to indicate that PSFCH is disabled.

b6: DCI being configured with no indication information related to HARQ and/or no indication information related to physical uplink control channel (PUCCH). No HARQ- and/or PUCCH-related indication information configured in the DCI indicates that PSFCH is disabled. Indication information related to PUCCH may be feedback information.

b7: A HARQ- and/or PUCCH-related indication field in DCI or SCI being in a reserved state. A HARQ- and/or PUCCH-related indication field in the DCI or SCI in a reserved state indicates that PSFCH is disabled.

b8: A HARQ- and/or PUCCH-related indication field in DCI or SCI indicating a null value. A HARQ- and/or PUCCH-related indication field in DCI or SCI indicating a null value indicates that PSFCH is disabled.

b9: A preset code point in DCI or SCI indicating that PSFCH is disabled. For example, a special code point (such as an invalid code point) in the DCI or SCI is used to indicate that PSFCH is disabled.

b10: Bit information in DCI or SCI indicating an enabled/disabled state of PSFCH. For example, one-bit information is used to indicate that PSFCH is disabled.

It should be noted that the foregoing methods of indicating, by using indication information, that PSFCH is disabled may be applied to UE without SL information reception capability, including UE not receiving PSFCH, such as UE not supporting reception of sidelink feedback information, sidelink data information, or sidelink control information, or UE not supporting simultaneous processing information over Uu interface and sidelink information. A resource pool selected by the terminal in this embodiment may be a resource pool configured with PSFCH or not. However, during UE data scheduling, PSFCH reception or transmission is disabled.

The foregoing manners of using signaling to indicate that PSFCH is disabled may be an explicit signaling indication or an implicit signaling indication. For example, SCI signaling indicates that PSFCH is disabled, SCI being a preset value implicitly indicates that PSFCH is disabled, some or all thresholds in DCI or SCI being preset values implicitly indicate that PSFCH is disabled, or a preset code point or bit information in DCI or SCI implicitly indicates that PSFCH is disabled. If the terminal receives at least one of the foregoing indication information, it is considered that PSFCH is disabled and the terminal gives no feedback. For example, if some thresholds in DCI received by the terminal are preset values, it is considered that PSFCH is disabled and no feedback is transmitted; or if a HARQ- and/or PUCCH-related indication field in DCI or SCI received by the terminal is in a reserved state, it is considered that PSFCH is disabled and no feedback is transmitted. That is, any one or more of the foregoing manners may be used to explicitly or implicitly indicate that PSFCH is disabled.

Optionally, the resource selected according to the information processing capability of the terminal or the type of the terminal is a resource including no PSFCH. The resource including no PSFCH may be a non-PSFCH resource position. For example, when the terminal does not support reception of SL information, the UE transmits information on a non-PSFCH resource. It should be noted that the resource pool selected by the terminal in this embodiment may be a resource pool configured with PSFCH or not. For example, the resource pool selected by the terminal is a resource pool including no PSFCH resource, or the terminal selects a resource pool configured with PSFCH, but the resource selected includes no PSFCH resource.

Further, in a case that the terminal is a first type of terminal, or that the terminal does not support reception of sidelink feedback information or sidelink feedback channel, or that a resource selection mode of the terminal is a random selection mode, the selected resource pool includes no feedback resource.

The first type of terminal may be PUE, that is, UE with low complexity or low power consumption or low processing capability. If the terminal is PUE, the resource selected by the PUE includes no feedback resource, or in a case that the terminal does not support reception of PSFCH or sidelink feedback information, the resource selected by the terminal includes no feedback resource, or in a case that the resource selection mode of the terminal is a random selection mode, the resource selected by the terminal includes no feedback resource.

Optionally, in a case that the terminal supports reception of PSFCH or sidelink feedback information, but does not support reception of sidelink control information or PSCCH or reception of sidelink data information or PSSCH, the terminal may select a resource pool including no feedback resource, or select a resource pool with PSFCH being disabled, or select a resource including no PSFCH.

In a case that the terminal supports reception of sidelink data information, sidelink control information, and sidelink feedback information, or that the terminal supports reception of sidelink control channel, sidelink shared channel, and sidelink feedback channel, or that the resource selection mode of the terminal is a partial sensing mode, the terminal may select a resource pool including no feedback resource, or select a resource pool with PSFCH disabled, or select a resource including no PSFCH.

The resource pool selected by the terminal may be a transmit and/or receive resource pool.

Specifically, in a case that a resource is selected according to the information processing capability of the terminal or the type of the terminal, the terminal performs a target operation, and the target operation includes at least one of the following:

(a) ignoring cast type indication information by the terminal. For example, the terminal ignores a cast type indication (including a cast type indication field), where the cast type indication information may be indication information of a unicast, groupcast or broadcast type;

(b) ignoring hybrid automatic repeat request HARQ enable or disable indication information by the terminal, and ignoring some or all feedback-related indication information by the terminal, for example, HARQ enable or disable indication information, considering HARQ enable/disable indication invalid, and considering PSFCH disabled; or (c) ignoring PSFCH frequency domain resource configuration information by the terminal, and ignoring feedback-related indication information by the terminal, such as frequency domain resource configuration information of PSFCH, and PSFCH being disabled.

Sidelink transmission modes vary for different information processing capabilities of the terminal or different terminal types. Transmission mode processing, management, or establishment of the terminal is related to the capability of the terminal or the type of the terminal. Specifically, the processing sidelink transmission includes:

establishing unicast transmission or groupcast transmission in a case that the terminal is a first type of terminal or that the terminal supports reception of sidelink feedback information or sidelink feedback channel.

The first type of terminal may be PUE, that is, UE with low complexity or low power consumption or low processing capability. In this embodiment, in a case that the terminal is PUE or that the terminal supports reception of sidelink feedback information/PSFCH, unicast transmission or groupcast transmission is allowed to be established. The groupcast transmission may be connection-based groupcast transmission.

Optionally, during establishment of unicast transmission or groupcast transmission, in a case that the terminal supports reception of sidelink feedback channel or sidelink feedback information, it is determined that a unicast connection or groupcast connection is successfully established when the terminal receives at least one piece of acknowledgment ACK information. For example, in a case that the terminal receives one piece of ACK information, or that the terminal receives multiple pieces of ACK information, or that the terminal receives multiple consecutive pieces of ACK information, or that the terminal receives no NACK after sending a connection establishment request, it is considered that a unicast connection or groupcast connection is established successfully or an RRC connection is established successfully.

Specifically, during sidelink transmission processing, the terminal supporting reception of sidelink feedback channel or sidelink feedback information may be a terminal supporting reception of sidelink feedback information but not supporting reception of sidelink data information or sidelink control information, or a terminal supporting reception of sidelink feedback channel but not supporting reception of sidelink control channel or sidelink shared channel, or a terminal supporting reception of sidelink data information, sidelink control information, and sidelink feedback information, or a terminal supporting reception of sidelink control channel, sidelink shared channel, and sidelink feedback channel, or a terminal supporting simultaneous processing of information over Uu interface and sidelink information.

Optionally, the processing sidelink transmission further includes: in a case that the terminal is a first type of terminal or that the terminal does not support reception of sidelink information or sidelink channel, forbidding unicast transmission establishment or ignoring a unicast connection establishment message by the terminal.

In this embodiment, the first type of terminal may be PUE, that is, UE with low complexity or low power consumption or low processing capability. In this embodiment, that the terminal does not support reception of sidelink information may be: that the terminal does not support reception of sidelink feedback information, sidelink data information, or sidelink control information, or that the terminal supports reception of sidelink feedback information but does not support reception of sidelink data information or sidelink control information, or the terminal does not support simultaneous processing of information over Uu interface and the sidelink information. That the terminal does not support reception of sidelink channel may include: the terminal does not support reception of sidelink feedback channel, sidelink control channel, or sidelink shared channel, or the terminal supports reception of sidelink feedback channel but does not support reception of sidelink control channel or sidelink shared channel. The forbidding unicast transmission establishment may include failing to establish/re-establish/modify/release an RRC connection.

Optionally, in a case that the terminal is a first type of terminal or that the terminal does not support reception of sidelink information or sidelink channel, the terminal does not expect to establish unicast transmission.

Groupcast transmission processing manners vary for different information processing capabilities of the terminal or different terminal types. Specifically, during groupcast transmission, in a case that a terminal capability indicates that the terminal supports reception of sidelink feedback information or sidelink feedback channel, the terminal satisfies at least one of the following:

(1) Sidelink control information SCI of the terminal uses an SCI format in which hybrid automatic repeat request acknowledgement HARQ-ACK information includes only negative acknowledgement NACK. The SCI may be second-stage SCI, and the second-stage SCI is transmitted on PSSCH. For example, second-stage SCI of UE is indicated by using an SCI format in which HARQ-ACK information includes only NACK (such as format 2-B).

(2) Second-stage SCI of the terminal uses SCI format 2-B.

(3) The terminal supports reception of N or fewer pieces of sidelink feedback information, where N, as a bearable quantity, may be a value predefined by the protocol, or configured or preconfigured by the terminal or network.

(4) The terminal supports M or fewer group members in groupcast transmission, where M, as a bearable quantity, may be a value predefined by the protocol, or configured or preconfigured by the terminal or network, and the group members may include a group head or not.

(5) The terminal does not support transmission of group-cast type 2, where the groupcast type 2 is groupcast option 2.

(6) SCI of the terminal does not use an SCI format in which HARQ-ACK information is NACK or ACK.

(7) The terminal supports only transmission of groupcast type 1, where the groupcast type 1 is groupcast option 1.

(8) SCI indication information of the terminal does not indicate ACK. For example, ACK cannot be indicated in SCI of the terminal.

During groupcast transmission, in a case that a terminal capability indicates that the terminal does not support reception of sidelink feedback information or sidelink feedback channel, the terminal may satisfy at least one of the following:

the terminal does not support transmission of groupcast type 2, where the groupcast type 2 is groupcast option 2;

SCI of the terminal does not use an SCI format in which HARQ-ACK information is NACK or ACK; or SCI indication information of the terminal does not indicate ACK. For example, ACK cannot be indicated in SCI of the terminal.

In the conditions that the terminal needs to satisfy during groupcast transmission, feedback of groupcast option 2 means that each receive end UE feeds back ACK/NACK on a corresponding resource according to a predefined/precon-figured rule; and feedback of groupcast option 1 means that receive end UEs in a same group feed back NACK on a same resource.

It should be noted that the terminal does not support reception of sidelink feedback information or sidelink feed-back channel indicates that an information processing capa-bility of the terminal includes not supporting at least recep-tion of sidelink feedback information or sidelink feedback channel. For example, if the information processing capa-bility of the terminal is: not supporting sidelink information or not supporting simultaneous processing of information over Uu interface and information over PC5 interface, it indicates that the terminal may satisfy at least one of the foregoing in a case that the information processing capabil-ity of the terminal includes not supporting at least reception of sidelink feedback information or sidelink feedback chan-nel.

Optionally, the method further includes: configuring a logical channel for the terminal, a logical channel mapping rule, or a logical channel group according to the information processing capability of the terminal or the type of the terminal.

In this embodiment, a logical channel configuration of the terminal is related to the information processing capability of the terminal or the type of the terminal. The configuring a logical channel for the terminal or a logical channel mapping rule according to the information processing capa-bility of the terminal or the type of the terminal may include: defining/configuring a special logical channel (LCH) or a LCH mapping rule or a logical channel group for UE with low complexity/low power consumption/low processing capability.

For example, in a case that the terminal supports reception of SL information, a first logical channel, or a first logical channel mapping rule is configured for the terminal; and in a case that the terminal does not support reception of SL information, a second logical channel, or a second logical channel mapping rule is configured for the terminal.

The configuring a logical channel for the terminal or a logical channel mapping rule according to the type of the terminal may include: configuring a first logical channel or a first logical channel mapping rule for a first type of terminal, and configuring a second logical channel or a second logical channel mapping rule for a second type of terminal. For example, for communications with a same reliability requirement, if the terminal is VUE, a LCH mapping may be configured and PSFCH is enabled; and if the terminal is PUE (UE with low processing capability), another LCH mapping may be configured (for example, N blind retransmissions are performed because PSFCH is not supported).

Optionally, if the PUE supports information reception (including supporting reception of PSFCH/feedback infor-mation and reception of PSSCH/data and PSCCH/control information), it is determined according to a condition in R16 whether a unicast connection is established.

Optionally, the method further includes: predefining, pre-configuring, or configuring at least one of the following processing time:

processing time for sidelink feedback information;

processing time for sidelink feedback channel;

physical sidelink shared channel PSSCH processing time;

physical sidelink control channel PSCCH processing time;

processing time from reception of physical downlink control channel (PDCCH) to PSSCH, where the PSSCH is a PSSCH scheduled by the PDCCH; or processing time from reception of PSFCH to transmission of physical uplink control channel PUCCH.

At least one of the foregoing processing times is defined in UE. The processing time is related to a UE type and/or a subcarrier spacing (Sub Carrier Space, SCS). Specifically, the predefining, preconfiguring or configuring processing time includes: obtaining the processing time according to the type of the terminal and/or the subcarrier spacing SCS. It should be noted that different terminal types may need different processing times. For example, PUE may need more processing time than VUE, and therefore a longer processing time may be defined for the PUE (UE with low complexity/low power consumption/low processing capa-bility).

The following describes, by using a specific embodiment, an implementation method of the selecting a resource and processing sidelink transmission according to information processing capability of the terminal or a type of the terminal.

For example, the terminal does not support reception of PSSCH/PSCCH but supports reception of PSFCH. The UE manages/establishes a sidelink connection according to a predefined/configured rule in consideration of RRC connec-tion reestablishment in unicast.

Manner 1: A transmit end UE transmits RRC connection establishment/reestablishment information to a receive end UE. If the receive end demodulates the information success-fully, an ACK is transmitted; and if the demodulation fails, a NACK is transmitted. If the receive end receives the ACK information, it is considered that a connection is established successfully.

Manner 2: A transmit end UE transmits RRC connection establishment/reestablishment information to a receive end UE, where the information includes transmit end capability configuration information; and the receive end transmits information according to the capability configuration infor-mation transmitted. After the receive end obtains, through demodulation, a transmit end reception capability of supporting only reception of PSFCH in SL, if the receive end cannot comply with a configuration in the establishment/reestablishment information, the receive end transmits NACK information; otherwise, the receive end transmits ACK information. If the transmit end receives the ACK information, it is considered that a connection is established successfully. If the transmit end receives the NACK information, it is considered that a connection is established unsuccessfully.

For example, in a case that the UE does not support reception of PSSCH/PSCCH, but supports reception of PSFCH, if the UE transmits data within a group (a group established by an upper layer) and an identity document (Identity document, ID) of the receive end is a groupcast ID (group ID information determined by an upper layer), second-stage SCI transmitted by the UE uses an SCI format in which HARQ ACK information includes only NACK, to schedule information, or uses SCI format 2-B to schedule information. It should be noted that it is considered that in this embodiment, only groupcast option 1 transmission is enabled.

In this embodiment of this application, according to different information processing capabilities of the UE or different terminal types, the UE performs differently in resource or resource pool selection, unicast processing, and groupcast processing. In a case that the UE supports feedback-based data transmission, transmission efficiency of the transmit end UE can be improved and spectrum utilization can be increased. In a case that the terminal does not support data reception, on a basis of supporting reception of PSFCH, a unicast connection establishment condition can be defined. Establishing a unicast connection in the UE may improve resource utilization of the transmit end UE.

In this embodiment of this application, resource selection and/or sidelink transmission processing mode is defined for the terminal according to the information processing capability of the terminal or the type of the terminal, so as to improve resource utilization of the transmit terminal, thereby increasing transmission efficiency of the transmit terminal, boosting system spectrum utilization, and reducing terminal power consumption.

It should be noted that the information processing method provided in this embodiment of this application may be performed by an information processing apparatus or a control module for performing the information processing method in the information processing apparatus. In this embodiment of this application, the information processing apparatus provided in the embodiments of this application is described by using an example in which the information processing apparatus performs the information processing method.

Figure 3:
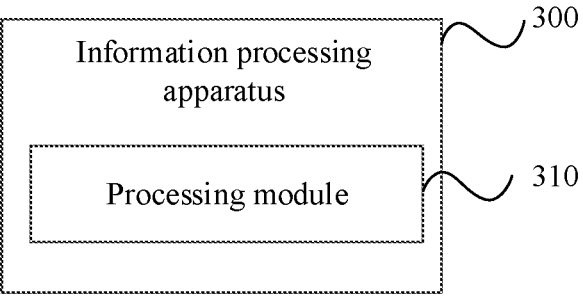
FIG. 3 is a schematic structural diagram of an information processing apparatus according to an embodiment of this application.

As shown in FIG. 3, an embodiment of this application provides an information processing apparatus 300, including:

a processing module 310, configured to make resource selection according to an information processing capability of a terminal or a type of the terminal; and/or process sidelink transmission according to the information processing capability of the terminal or the type of the terminal.

Optionally, the information processing capability includes one of the following:

not supporting reception of sidelink channel;

supporting reception of sidelink feedback information, but not supporting reception of sidelink data information or sidelink control information;

supporting reception of sidelink feedback channel, but not supporting reception of sidelink control channel or sidelink shared channel;

supporting reception of sidelink data information, sidelink control information, and sidelink feedback information;

supporting reception of sidelink control channel, sidelink shared channel, and sidelink feedback channel;

supporting reception of sidelink feedback channel and sidelink control channel, but not supporting reception of sidelink shared channel;

supporting simultaneous processing of information over Uu interface and information over PC5 interface, where the information over PC5 interface includes sidelink feedback information, sidelink data information, and sidelink control information;

not supporting simultaneous processing of information over Uu interface and information over PC5 interface;

supporting transmission of sidelink feedback channel; or not supporting transmission of sidelink feedback channel.

Optionally, the processing module includes at least one of the following:

a first selection unit, configured to select a resource pool or resource according to a rule corresponding to the information processing capability;

a second selection unit, configured to select, according to the information processing capability, a resource pool or resource corresponding to the information processing capability; or a third selection unit, configured to select, according to a resource selection mode of the terminal, a resource pool or resource corresponding to the information processing capability.

Optionally, the processing module includes at least one of the following:

a fourth selection unit, configured to select a resource pool or resource according to a rule corresponding to the type of the terminal;

a fifth selection unit, configured to select, according to the type of the terminal, a resource pool or resource corresponding to the type of the terminal; or a sixth selection unit, configured to select, according to a resource selection mode of the terminal, a resource pool or resource corresponding to the type of the terminal.

Optionally, the selected resource pool satisfies at least one of the following conditions:

being a resource pool including no feedback resource; and physical sidelink feedback channel PSFCH being disabled.

Optionally, the selected resource is:

a resource including no PSFCH.

Optionally, the selected resource pool includes no feedback resource, including one of the following:

the resource pool does not support PSFCH configuration;

PSFCHs in the resource pool are configured with a period of zero; or no PSFCH is configured in the resource pool.

Optionally, the physical sidelink feedback channel PSFCH being disabled is indicated by using at least one of the following manners:

radio resource control RRC indicating that PSFCH is disabled;

sidelink control information SCI indicating that PSFCH is disabled;

downlink control information DCI indicating no feedback;

field values of DCI being partially or all configured to preset values, respectively; or field values of SCI being partially or all configured to preset values, respectively;

DCI being configured with no indication information related to HARQ and/or no indication information related to physical uplink control channel PUCCH;

a HARQ- and/or PUCCH-related indication field in DCI or SCI being in a reserved state;

a HARQ- and/or PUCCH-related indication field in DCI or SCI indicating a null value;

a preset code point in DCI or SCI indicating that PSFCH is disabled; and bit information in DCI or SCI indicating an enabled/ disabled state of PSFCH.

Optionally, in a case that the terminal is a first type of terminal, or that the terminal does not support reception of sidelink feedback information or sidelink feedback channel, or that a resource selection mode of the terminal is a random selection mode, the selected resource pool includes no feedback resource.

Optionally, in the case of making resource selection according to the information processing capability of the terminal or the type of the terminal, the terminal performs a target operation.

The target operation includes at least one of the following:

ignoring, by the terminal, cast type indication information;

ignoring, by the terminal, hybrid automatic repeat request HARQ enable or disable indication information; or ignoring, by the terminal, PSFCH frequency domain resource configuration information.

Optionally, the processing module is specifically configured to:

establish unicast transmission or groupcast transmission in a case that the terminal is a first type of terminal or that the terminal supports reception of sidelink feedback information or sidelink feedback channel.

Optionally, in a case that the terminal supports reception of sidelink feedback channel or sidelink feedback information, it is determined that a unicast connection or a groupcast connection is successfully established when the terminal receives at least one piece of acknowledgment ACK information.

Optionally, the processing module is specifically configured to:

in a case that the terminal is a first type of terminal or that the terminal does not support reception of sidelink information or sidelink channel, forbid unicast transmission establishment or enable the terminal to ignore any unicast connection establishment message.

Optionally, in a case that a terminal capability indicates that the terminal supports reception of sidelink feedback information or sidelink feedback channel, the terminal satisfies at least one of the following:

sidelink control information SCI of the terminal uses an SCI format in which hybrid automatic repeat request acknowledgement HARQ-ACK information includes only negative acknowledgement NACK;

second-stage SCI of the terminal uses SCI format 2-B;

the terminal supports reception of N or fewer pieces of sidelink feedback information;

the terminal supports groupcast transmission with M or fewer group members; or the terminal does not support transmission of groupcast type 2;

SCI of the terminal does not use an SCI format in which HARQ-ACK information is NACK or ACK;

the terminal supports only transmission of groupcast type 1; and

SCI indication information of the terminal does not indicate ACK.

Optionally, in a case that a terminal capability indicates that the terminal does not support reception of sidelink feedback information or sidelink feedback channel, the terminal satisfies at least one of the following:

the terminal does not support transmission of groupcast type 2;

SCI of the terminal does not use an SCI format in which HARQ-ACK information is NACK or ACK; or SCI indication information of the terminal does not indicate ACK.

Optionally, the information processing apparatus further includes:

a first configuration module, configured to configure a logical channel for the terminal, a logical channel mapping rule, or a logical channel group according to the information processing capability of the terminal or the type of the terminal.

Optionally, the information processing apparatus further includes:

a second configuration module, configured to predefine, preconfigure, or configure at least one of the following processing time:

processing time for sidelink feedback information;

processing time for sidelink feedback channel;

physical sidelink shared channel PSSCH processing time;

physical sidelink control channel PSCCH processing time;

processing time from reception of physical downlink control channel PDCCH to PSSCH; or processing time from reception of PSFCH to transmission of physical uplink control channel PUCCH.

Optionally, the second configuration module is specifically configured to obtain the processing time according to the type of the terminal and/or a subcarrier spacing SCS.

In this embodiment of this application, according to an information processing capability of a terminal or a type of the terminal, resource selection is made and/or sidelink transmission is processed. Different resource selection modes and sidelink transmission modes may be defined for different information processing capabilities or terminal types, so as to improve resource utilization of the transmit terminal, thereby increasing transmission efficiency of the transmit terminal, boosting system spectrum utilization, and reducing terminal power consumption.

The information processing apparatus in this embodiment of this application may be an apparatus, or may be a component, an integrated circuit, or a chip in the terminal. The apparatus may be a mobile terminal or may be a non-mobile terminal. For example, the mobile terminal may include but is not limited to the foregoing terminal 11 type, and the non-mobile terminal may be a server, a network attached storage (NAS), a personal computer (PC), a television (TV), a teller machine, a self-service machine, or the like. This is not specifically limited in this embodiment of this application.

The information processing apparatus in this embodiment of this application may be an apparatus with an operating system. The operating system may be an Android operating system, may be an iOS operating system, or may be another possible operating system. This is not specifically limited in this embodiment of this application.

The information processing apparatus provided in this embodiment of this application can implement the processes implemented in the method embodiment in FIG. 2, with the same technical effects achieved. To avoid repetition, details are not described herein again.

Figure 4:
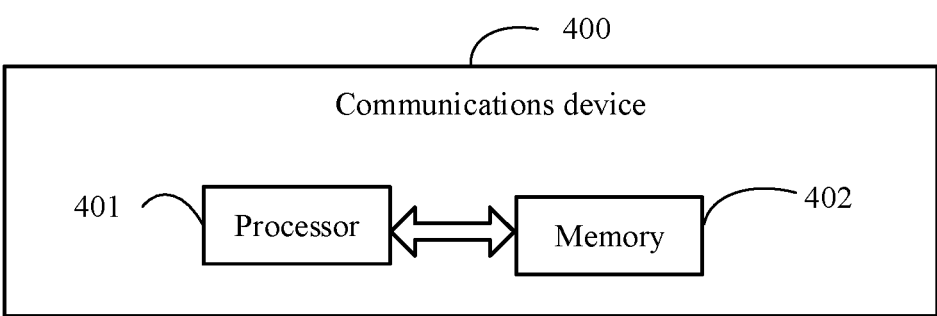
FIG. 4 is a schematic structural diagram of a communications device according to an embodiment of this application.

Optionally, as shown in FIG. 4, an embodiment of this application further provides a communications device 400, including a processor 401, a memory 402, and a program or instructions stored in the memory 402 and capable of running on the processor 401. For example, if the communications device 400 is a terminal, when the program or instructions are executed by the processor 401, the processes of the foregoing embodiments of the information processing method are implemented, with the same technical effects achieved. To avoid repetition, details are not described herein again.

Figure 5:
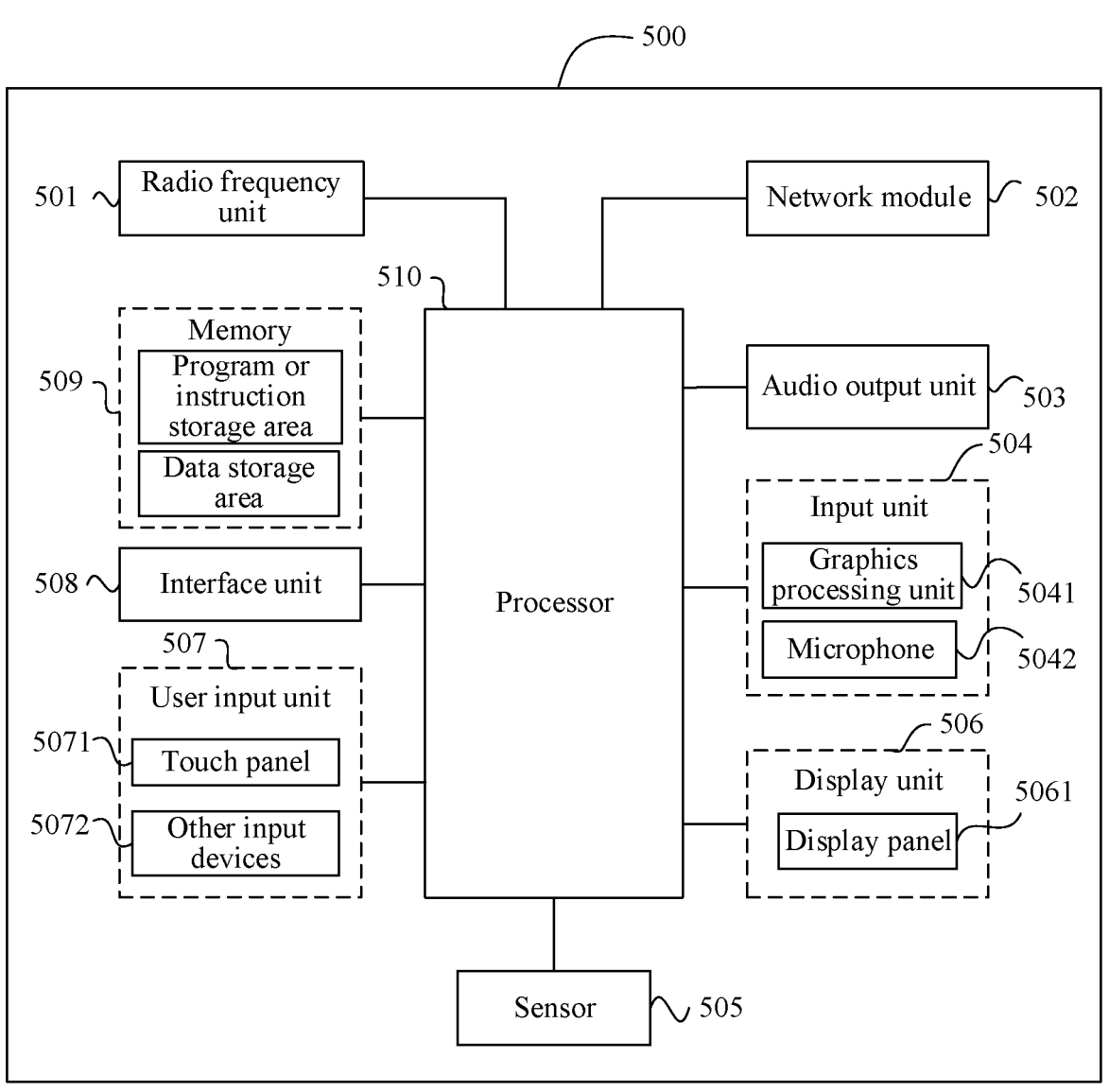
FIG. 5 is a structural block diagram of a terminal according to an embodiment of this application.

FIG. 5 is a schematic diagram of a hardware structure of a terminal implementing an embodiment of this application.

The terminal 500 includes but is not limited to components such as a radio frequency unit 501, a network module 502, an audio output unit 503, an input unit 504, a sensor 505, a display unit 506, a user input unit 507, an interface unit 508, a memory 509, and a processor 510.

A person skilled in the art can understand that the terminal 500 may further include a power supply (such as a battery) for supplying power to the components. The power supply may be logically connected to the processor 510 through a power management system. In this way, functions such as charge management, discharge management, and power consumption management are implemented by using the power management system. The terminal structure shown in FIG. 5 does not constitute a limitation to the terminal. The terminal may include more or fewer components than shown in the figure, or some components may be combined, or there may be a different component arrangement. Details are not described herein.

It should be understood that in this embodiment of this application, the input unit 504 may include a graphics processing unit (GPU) 5041 and a microphone 5042. The graphics processing unit 5041 processes image data of a static picture or a video that is obtained by an image capture apparatus (for example, a camera) in a video capture mode or an image capture mode. The display unit 506 may include a display panel 5061. The display panel 5061 may be configured in a form of a liquid crystal display, an organic light-emitting diode, or the like. The user input unit 507 includes a touch panel 5071 and other input devices 5072. The touch panel 5071 is also referred to as a touchscreen. The touch panel 5071 may include two parts: a touch detection apparatus and a touch controller. The other input devices 5072 may include but are not limited to a physical keyboard, a functional button (such as a volume control button or a power on/off button), a trackball, a mouse, and a joystick. Details are not described herein.

In this embodiment of this application, the radio frequency unit 501 sends downlink information received from a network-side device to the processor 510 for processing, and in addition, sends uplink data to the network-side device. Generally, the radio frequency unit 501 includes but is not limited to an antenna, at least one amplifier, a transceiver, a coupler, a low noise amplifier, a duplexer, and the like.

The memory 509 may be configured to store software programs or instructions and various data. The memory 509 may mainly include a program or instruction storage area and a data storage area. The program or instruction storage area may store an operating system, an application program or instructions required by at least one function (for example, an audio playing function and an image playing function), and the like. In addition, the memory 509 may include a high-speed random access memory, and may further include a non-volatile memory, where the non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, such as at least one magnetic disk storage device, a flash storage device, or another non-volatile solid-state storage device.

The processor 510 may include one or more processing units. Optionally, the processor 510 may integrate an application processor and a modem processor. The application processor mainly processes an operating system, a user interface, an application program or instructions, and the like. The modem processor mainly processes wireless communication, and for example, may be a baseband processor. It should be understood that alternatively, the modem processor may not be integrated into the processor 510.

The processor 510 is configured to make resource selection according to an information processing capability of the terminal or a type of the terminal; and/or process sidelink transmission according to the information processing capability of the terminal or the type of the terminal.

In this embodiment of this application, according to an information processing capability of a terminal or a type of the terminal, resource selection is made and/or sidelink transmission is processed. Different resource selection modes and sidelink transmission modes may be defined for different information processing capabilities or terminal types, so as to improve resource utilization of the transmit terminal, thereby increasing transmission efficiency of the transmit terminal, boosting system spectrum utilization, and reducing terminal power consumption.

Optionally, the information processing capability includes one of the following:

not supporting reception of sidelink channel;

supporting reception of sidelink feedback information, but not supporting reception of sidelink data information or sidelink control information;

supporting reception of sidelink feedback channel, but not supporting reception of sidelink control channel or sidelink shared channel;

supporting reception of sidelink data information, sidelink control information, and sidelink feedback information;

supporting reception of sidelink control channel, sidelink shared channel, and sidelink feedback channel;

supporting reception of sidelink feedback channel and sidelink control channel, but not supporting reception of sidelink shared channel;

supporting simultaneous processing of information over Uu interface and information over PC5 interface, where the information over PC5 interface includes sidelink feedback information, sidelink data information, and sidelink control information;

not supporting simultaneous processing of information over Uu interface and information over PC5 interface;

supporting transmission of sidelink feedback channel; or not supporting transmission of sidelink feedback channel.

Optionally, that the processor 510 makes resource selection according to an information processing capability of the terminal includes at least one of the following:

selecting a resource pool or resource according to a rule corresponding to the information processing capability;

selecting, according to the information processing capability, a resource pool or resource corresponding to the information processing capability; or selecting, according to a resource selection mode of the terminal, a resource pool or resource corresponding to the information processing capability.

Optionally, that the processor 510 makes resource selection according to a type of the terminal includes at least one of the following:

selecting a resource pool or resource according to a rule corresponding to the type of the terminal;

selecting, according to the type of the terminal, a resource pool or resource corresponding to the type of the terminal; or selecting, according to a resource selection mode of the terminal, a resource pool or resource corresponding to the type of the terminal.

Optionally, the selected resource pool satisfies at least one of the following conditions:

being a resource pool including no feedback resource; or physical sidelink feedback channel PSFCH being disabled.

Optionally, the selected resource is:

a resource including no PSFCH.

Optionally, the selected resource pool includes no feedback resource, including one of the following:

the resource pool does not support PSFCH configuration;

PSFCHs in the resource pool are configured with a period of zero; or no PSFCH is configured in the resource pool.

Optionally, the physical sidelink feedback channel PSFCH being disabled is indicated by using at least one of the following manners:

radio resource control RRC indicating that PSFCH is disabled;

sidelink control information SCI indicating that PSFCH is disabled;

downlink control information DCI indicating no feedback;

field values of DCI being partially or all configured to preset values, respectively;

field values of SCI being partially or all configured to preset values, respectively;

DCI being configured with no indication information related to HARQ and/or no indication information related to physical uplink control channel PUCCH;

a HARQ- and/or PUCCH-related indication field in DCI or SCI being in a reserved state;

a HARQ- and/or PUCCH-related indication field in DCI or SCI indicating a null value;

a preset code point in DCI or SCI indicating that PSFCH is disabled; or bit information in DCI or SCI indicating an enabled/disabled state of PSFCH.

Optionally, in a case that the terminal is a first type of terminal, or that the terminal does not support reception of sidelink feedback information or sidelink feedback channel, or that a resource selection mode of the terminal is a random selection mode, the selected resource pool includes no feedback resource.

Optionally, when the processor 510 makes resource selection according to an information processing capability of the terminal or a type of the terminal, the terminal performs a target operation.

The target operation includes at least one of the following:

ignoring, by the terminal, cast type indication information;

ignoring, by the terminal, hybrid automatic repeat request HARQ enable or disable indication information; or ignoring, by the terminal, PSFCH frequency domain resource configuration information.

Optionally, the processor 510 is further configured to: in a case that the terminal is a first type of terminal or that the terminal supports reception of sidelink feedback information or sidelink feedback channel, establish unicast transmission or groupcast transmission.

Optionally, the processor 510 is further configured to: in a case that the terminal supports reception of sidelink feedback channel or sidelink feedback information, determine that a unicast connection or a groupcast connection is successfully established when the terminal receives at least one piece of acknowledgment ACK information.

Optionally, the processor 510 is further configured to: in a case that the terminal is a first type of terminal or that the terminal does not support reception of sidelink information or sidelink channel, forbid unicast transmission establishment or enable the terminal to ignore any unicast connection establishment message.

Optionally, in a case that a terminal capability indicates that the terminal supports reception of sidelink feedback information or sidelink feedback channel, the terminal satisfies at least one of the following:

sidelink control information SCI of the terminal uses an SCI format in which hybrid automatic repeat request acknowledgement HARQ-ACK information includes only negative acknowledgement NACK;

second-stage SCI of the terminal uses SCI format 2-B;

the terminal supports reception of N or fewer pieces of sidelink feedback information;

the terminal supports groupcast transmission with M or fewer group members;

the terminal does not support transmission of groupcast type 2;

SCI of the terminal does not use an SCI format in which HARQ-ACK information is NACK or ACK;

the terminal supports only transmission of groupcast type 1; or

SCI indication information of the terminal does not indicate ACK.

Optionally, in a case that a terminal capability indicates that the terminal does not support reception of sidelink feedback information or sidelink feedback channel, the terminal satisfies at least one of the following:

the terminal does not support transmission of groupcast type 2;

SCI of the terminal does not use an SCI format in which HARQ-ACK information is NACK or ACK; or SCI indication information of the terminal does not indicate ACK.

Optionally, the processor 510 is further configured to: configure a logical channel for the terminal, a logical channel mapping rule, or a logical channel group according to the information processing capability of the terminal or the type of the terminal.

Optionally, the processor 510 is further configured to predefine, preconfigure, or configure at least one of the following processing time:

processing time for sidelink feedback information;

processing time for sidelink feedback channel;

physical sidelink shared channel PSSCH processing time;

physical sidelink control channel PSCCH processing time;

processing time from reception of physical downlink control channel PDCCH to PSSCH; or processing time from reception of PSFCH to transmission of physical uplink control channel PUCCH.

Optionally, when predefining, preconfiguring, or configuring the processing time, the processor 510 is further configured to obtain the processing time according to the type of the terminal and/or subcarrier spacing SCS.

In this embodiment of this application, according to an information processing capability of a terminal or a type of the terminal, resource selection is made and/or sidelink transmission is processed. Different resource selection modes and sidelink transmission modes may be defined for different information processing capabilities or terminal types, so as to improve resource utilization of the transmit terminal, thereby increasing transmission efficiency of the transmit terminal, boosting system spectrum utilization, and reducing terminal power consumption.

An embodiment of this application further provides a readable storage medium, where the readable storage medium stores a program or instructions, and when the program or instructions are executed by a processor, the processes of the foregoing embodiments of the information processing method are implemented, with the same technical effects achieved. To avoid repetition, details are not described herein again.

The processor is the processor in the terminal in the foregoing embodiments. The readable storage medium includes a computer-readable storage medium such as a computer read-only memory (ROM), a random access memory (RAM), a magnetic disk, or an optical disc.

An embodiment of this application further provides a chip, where the chip includes a processor and a communications interface, the communications interface is coupled to the processor, and the processor is configured to run a program or instructions to implement the processes of the foregoing embodiments of the information processing method, with the same technical effects achieved. To avoid repetition, details are not described herein again.

It should be understood that the chip mentioned in this embodiment of this application may also be referred to as a system-level chip, a system chip, a chip system, a system-on-chip, or the like.

It may be understood that the embodiments described in this disclosure may be implemented by hardware, software, firmware, middleware, microcode, or a combination thereof. For hardware implementation, a module, a unit, a sub-module, a sub-unit, or the like may be implemented in one or more application-specific integrated circuits (ASIC), digital signal processors (, DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in this application, or a combination thereof.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In the absence of more restrictions, an element defined by "including a . . . " does not exclude another same element in a process, method, article, or apparatus that includes the element. In addition, it should be noted that the scopes of the method and apparatus in the implementations of this application are not limited to performing functions in the sequence shown or discussed, and may further include performing functions at substantially the same time or in a reverse sequence according to the involved functions. For example, the described method may be performed in a sequence different from the described sequence, and steps may be added, omitted, or combined. In addition, features described with reference to some examples may be combined in other examples.

By means of the foregoing description of the implementations, persons skilled in the art may clearly understand that the method in the foregoing embodiments may be implemented by software with a necessary general hardware platform. Certainly, the method in the foregoing embodiments may also be implemented by hardware. However, in many cases, the former is an example implementation. Based on such an understanding, the technical solutions of this application essentially, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, a person of ordinary skill in the art may develop many other manners without departing from principles of this application and the protection scope of the claims, and all such manners fall within the protection scope of this application.

What is claimed is:

1. An information processing method, performed by a terminal and comprising:

making resource selection according to an information processing capability of the terminal;

wherein the information processing capability comprises: not supporting reception of sidelink feedback channel;

wherein in a case that the information processing capability indicates that the terminal does not support reception of sidelink feedback channel, PSFCH is disabled;

wherein the method further comprises:

configuring a logical channel mapping rule, according to the information processing capability of the terminal.

2. The information processing method according to claim 1, wherein the making resource selection according to an information processing capability of the terminal comprises at least one of the following:

selecting a resource pool or resource according to a rule corresponding to the information processing capability;

selecting, according to the information processing capability, a resource pool or resource corresponding to the information processing capability; or selecting, according to a resource selection mode of the terminal, a resource pool or resource corresponding to the information processing capability.

3. The information processing method according to claim 2, wherein the selected resource pool satisfies at least one of the following conditions:

being a resource pool comprising no feedback resource; or physical sidelink feedback channel (PSFCH) being disabled.

4. The information processing method according to claim 3, wherein the selected resource pool comprising no feedback resource comprises one of the following:

the resource pool does not support PSFCH configuration;

PSFCHs in the resource pool are configured with a period of zero; or no PSFCH is configured in the resource pool.

5. The information processing method according to claim 3, wherein the physical sidelink feedback channel PSFCH being disabled is indicated by using at least one of the following manners:

radio resource control (RRC) indicating that PSFCH is disabled;

sidelink control information (SCI) indicating that PSFCH is disabled;

downlink control information (DCI) indicating no feedback;

field values of DCI being partially or all configured to preset values, respectively;

field values of SCI being partially or all configured to preset values, respectively;

DCI being configured with no indication information related to HARQ and/or no indication information related to physical uplink control channel PUCCH;

a HARQ- and/or PUCCH-related indication field in DCI or SCI being in a reserved state;

a HARQ- and/or PUCCH-related indication field in DCI or SCI indicating a null value;

a preset code point in DCI or SCI indicating that PSFCH is disabled; or bit information in DCI or SCI indicating an enabled/disabled state of PSFCH.

6. The information processing method according to claim 3, wherein the selected resource pool comprises no feedback resource in a case that the terminal does not support reception of sidelink feedback channel, or that a resource selection mode of the terminal is a random selection mode.

7. The information processing method according to claim 2, wherein the selected resource is:

a resource comprising no PSFCH.

8. The information processing method according to claim 1, wherein in the case of making resource selection according to an information processing capability of the terminal, the terminal performs a target operation, wherein the target operation comprises at least one of the following:

ignoring, by the terminal, cast type indication information;

ignoring, by the terminal, hybrid automatic repeat request (HARQ) enable or disable indication information; or ignoring, by the terminal, PSFCH frequency domain resource configuration information.

9. The information processing method according to claim 1, wherein in a case that the information processing capability of the terminal indicates that the terminal does not support reception of sidelink feedback channel, the terminal satisfies at least one of the following:

the terminal does not support transmission of groupcast type 2;

SCI of the terminal does not use an SCI format in which HARQ-ACK information is NACK or ACK; or SCI indication information of the terminal does not indicate ACK.

10. The information processing method according to claim 1, wherein the method further comprises: predefining, preconfiguring, or configuring at least one of the following processing time:

processing time for sidelink feedback information;

processing time for sidelink feedback channel;

physical sidelink shared channel (PSSCH) processing time;

physical sidelink control channel (PSCCH) processing time;

processing time from reception of physical downlink control channel (PDCCH) to PSSCH; or processing time from reception of PSFCH to transmission of physical uplink control channel PUCCH.

11. The information processing method according to claim 10, wherein the predefining, preconfiguring, or configuring the processing time comprises:

obtaining the processing time according to the type of the terminal and/or a subcarrier spacing (SCS).

12. The information processing method according to claim 1, wherein the configuring a logical channel mapping rule, according to the information processing capability of the terminal comprises:

in a case that the terminal supports reception of SL information, configuring a first logical channel mapping rule for the terminal; and in a case that the terminal does not support reception of SL information, configuring a second logical channel mapping rule for the terminal.

13. A terminal, comprising a processor, a memory, and instructions stored in the memory and capable of running on the processor, wherein when the instructions are executed by the processor, steps of an information processing method are implemented, the steps comprise:

making resource selection according to an information processing capability of the terminal;

wherein the information processing capability comprises: not supporting reception of sidelink feedback channel;

wherein in a case that the information processing capability indicates that the terminal does not support reception of sidelink feedback channel, PSFCH is disabled;

wherein the steps further comprise:

configuring a logical channel mapping rule, according to the information processing capability of the terminal.

14. The terminal according to claim 13, wherein the configuring a logical channel mapping rule, according to the information processing capability of the terminal comprises:

in a case that the terminal supports reception of SL information, configuring a first logical channel mapping rule for the terminal; and in a case that the terminal does not support reception of SL information, configuring a second logical channel mapping rule for the terminal.

15. A non-transitory readable storage medium, wherein the readable storage medium stores a program or instructions, and when the instructions are executed by a processor, steps of an information processing method are implemented, the steps comprise:

making resource selection according to an information processing capability of a terminal;

wherein the information processing capability comprises: not supporting reception of sidelink feedback channel;

wherein in a case that the information processing capability indicates that the terminal does not support reception of sidelink feedback channel, PSFCH is disabled;

wherein the steps further comprise:

configuring a logical channel mapping rule, according to the information processing capability of the terminal.

16. The non-transitory readable storage medium according to claim 15, wherein the configuring a logical channel mapping rule, according to the information processing capability of the terminal comprises:

in a case that the terminal supports reception of SL information, configuring a first logical channel mapping rule for the terminal; and in a case that the terminal does not support reception of SL information, configuring a second logical channel mapping rule for the terminal.

\* \* \* \* \*